US010336460B2

(12) United States Patent
Ravise et al.

(10) Patent No.: US 10,336,460 B2
(45) Date of Patent: Jul. 2, 2019

(54) ACOUSTIC PANEL FOR AIRCRAFT NACELLE, AND METHOD OF MANUFACTURING THE ACOUSTIC PANEL

(71) Applicant: Airbus Operations S.A.S., Toulouse (FR)

(72) Inventors: Florian Ravise, Nantes (FR); Hassan Menay, Nantes (FR)

(73) Assignee: Airbus Operations S.A.S. (FR)

( * ) Notice: Subject to any disclaimer, the term of this patent is extended or adjusted under 35 U.S.C. 154(b) by 126 days.

(21) Appl. No.: 15/468,404

(22) Filed: Mar. 24, 2017

(65) Prior Publication Data

US 2017/0283082 A1 Oct. 5, 2017

(30) Foreign Application Priority Data

Apr. 4, 2016 (FR) ...................................... 16 52941

(51) Int. Cl.
*B32B 5/02* (2006.01)
*B32B 5/18* (2006.01)
*B32B 5/24* (2006.01)
*B32B 7/12* (2006.01)
*B32B 37/12* (2006.01)
(Continued)

(52) U.S. Cl.
CPC ............... *B64D 33/02* (2013.01); *B32B 5/024* (2013.01); *B32B 5/18* (2013.01); *B32B 5/245* (2013.01); *B32B 7/12* (2013.01); *B32B 37/12* (2013.01); *B32B 37/185* (2013.01); *B64D 29/02* (2013.01); *F02C 7/045* (2013.01); *G10K 11/172* (2013.01); *B32B 2037/1253* (2013.01); *B32B 2250/03* (2013.01); *B32B 2260/023* (2013.01); *B32B 2260/046* (2013.01); *B32B 2305/02* (2013.01); *B32B 2305/076* (2013.01); *B32B 2307/102* (2013.01); *B32B 2605/18* (2013.01); *B64D 2033/0206* (2013.01); *F05D 2230/20* (2013.01);
(Continued)

(58) Field of Classification Search
CPC .......... B32B 5/024; B32B 5/18; B32B 5/245; B32B 7/12; B32B 37/12; B32B 37/185; B64D 33/02; B64D 29/02; F02C 7/045; G10K 11/172
USPC ........................................................ 181/292
See application file for complete search history.

(56) References Cited

U.S. PATENT DOCUMENTS 4,390,584 A * 6/1983 Briens ................. B29D 24/005
428/116
4,504,346 A 3/1985 Newsam
(Continued)

FOREIGN PATENT DOCUMENTS

FR 2 527 367 A1 11/1983
FR 2 803 078 A1 6/2001
FR 2 953 058 A1 5/2011

OTHER PUBLICATIONS

FR 16 52941 Search Report dated Dec. 19, 2016.

*Primary Examiner* — Jeremy A Luks
(74) *Attorney, Agent, or Firm* — Lerner, David, Littenberg, Krumholz & Mentlik, LLP

(57) ABSTRACT

An acoustic panel for an aircraft nacelle includes a cellular layer configured to trap noise, a backplate fixed to one surface of the cellular layer and a facesheet fixed to another, opposite, surface of the cellular layer. The facesheet includes a layer of a preimpregnated woven material containing weft yarns spaced apart from one another and warp yarns spaced apart from one another so that the facesheet exhibits openings between the yarns.

4 Claims, 4 Drawing Sheets

(51) Int. Cl.
*B32B 37/18* (2006.01)
*B64D 33/02* (2006.01)
*B64D 29/02* (2006.01)
*F02C 7/045* (2006.01)
*G10K 11/172* (2006.01)

(52) U.S. Cl.
CPC ............... *F05D 2260/963* (2013.01); *F05D 2300/6012* (2013.01); *Y02T 50/671* (2013.01)

(56) References Cited

U.S. PATENT DOCUMENTS

| | | | | |
|---|---|---|---|---|
| 4,671,841 A * | 6/1987 | Stephens | ................... | B32B 3/12 156/292 |
| 4,833,029 A * | 5/1989 | DuPont | ................... | B32B 3/12 428/116 |
| 6,179,086 B1 * | 1/2001 | Bansemir | ................ | G10K 11/172 181/198 |
| 6,371,242 B1 * | 4/2002 | Wilson | ................... | B32B 3/12 181/210 |
| 6,475,596 B2 * | 11/2002 | Hsiao | ................... | B29C 70/22 428/116 |
| 6,607,625 B2 * | 8/2003 | Andre | ................... | B32B 3/12 156/169 |
| 6,663,737 B2 * | 12/2003 | Hsiao | ................... | B29C 70/22 156/160 |
| 8,646,574 B2 * | 2/2014 | Drevon | ................... | B32B 3/14 181/292 |
| 8,820,477 B1 * | 9/2014 | Herrera | ................. | F02C 7/045 181/284 |
| 2002/0157764 A1 * | 10/2002 | Andre | ................ | G10K 11/172 156/156 |
| 2013/0040117 A1 * | 2/2013 | Porte | ................... | F02K 1/827 428/201 |
| 2013/0183513 A1 * | 7/2013 | Porte | .................. | B32B 3/08 428/221 |
| 2015/0086335 A1 * | 3/2015 | Merlo | ................... | F02K 1/827 415/119 |
| 2017/0095997 A1 * | 4/2017 | Dodworth | ............... | B29C 43/56 |

* cited by examiner

ACOUSTIC PANEL FOR AIRCRAFT NACELLE, AND METHOD OF MANUFACTURING THE ACOUSTIC PANEL

FIELD OF THE INVENTION

The present invention relates to an acoustic panel for an aircraft nacelle.

The invention also relates to a method of manufacturing such an acoustic panel for an aircraft nacelle.

BACKGROUND OF THE INVENTION

Aircraft, notably jet aircraft, have turbojet engines which are significant sources of noise emissions.

In order to attenuate the emissions of noise coming from the turbojet engines, the nacelles of these turbojet engines are fitted with acoustic panels that line the internal wall of the nacelles in the region of the air intakes.

In general, these acoustic panels have a structure of sandwich type. They are usually shaped in a mold to give them a shape suitable for the nacelle to which they are to be fitted. These panels comprise one or several layers of cellular structure of the honeycomb type able to trap noise. This layer of cellular structure has an external face covered by a porous layer, referred to as the facesheet, and an internal face covered with an impermeable layer referred to as the backplate.

At the present time, the facesheet used for acoustic panels is manufactured using lengthy and complex processes. For example, the facesheet may be manufactured from facesheet strips welded together. After assembly, these facesheet strips require a full manual inspection in order to assess their quality. The facesheet strips are then welded together to cover the mold that shapes the acoustic panel. By way of example, the facesheet needs to cover an area of approximately 12 $m^2$ of a mold intended for a nacelle of an aircraft of the A380 type. The method of manufacturing the facesheet is therefore lengthy, complex and expensive to implement.

There are alternatives whereby facesheets are manufactured from perforated layers. The perforating may be done before or after the layers of the acoustic panel are assembled. However, the step of perforating these layers generates a significant waste of material of which these layers are made. The perforation step may also weaken the structure of the material of which these layers are made.

BRIEF SUMMARY OF THE INVENTION

An aspect of the present invention may alleviate these disadvantages by proposing an acoustic panel that is quick, inexpensive to manufacture and offers better mechanical strength.

An embodiment of the invention relates to an acoustic panel for an aircraft nacelle, comprising:
a cellular layer, the cellular layer being delimited by a first surface and by an opposite second surface,
a facesheet fixed to the first surface of the cellular layer,
a backplate fixed to the second surface of the cellular layer,
the facesheet comprising a layer of a preimpregnated woven material containing weft yarns spaced apart from one another and warp yarns spaced apart from one another, so that the facesheet exhibits openings between the yarns.

According to another particular feature, the weft yarns have a mutual spacing of between 0.3 mm and 1.5 mm.

Furthermore, the warp yarns have a mutual spacing of between 0.3 mm and 1.5 mm.

The invention also relates to a method of manufacturing an acoustic panel for an aircraft nacelle, comprising:
a step of applying a facesheet to the surface of a mold,
a step of fixing a first surface of a cellular layer configured to trap noise to the facesheet,
a step of fixing a backplate to a second surface of the cellular layer which is the opposite surface to the first surface,
the step of applying a facesheet to the surface of a mold consists in applying a layer of preimpregnated woven material containing weft yarns spaced apart from one another and warp yarns spaced apart from one another, so as to form openings between the yarns.

In addition, the method further comprises a step of forming the facesheet, including:
a step of weaving a layer so that the weft yarns of the weave are spaced apart from one another, and so that the warp yarns of the weave are spaced apart from one another, so as to form a layer of woven material,
a step of preimpregnating the woven material so as to form a layer of preimpregnated woven material.

According to an alternative form, the preimpregnation step comprises:
a step of dipping the woven material in a bath containing a resin dissolved in a solvent, and
a step of drying so that the solvent evaporates from the preimpregnated woven material.

According to another alternative form, the preimpregnation step comprises:
a step of applying a resin to a substrate using a hot-melt method, and
a step of pressing and heating the substrate with the woven material so that the resin impregnates the woven material.

Optionally, the step of applying the facesheet to the surface of a mold is followed by a step of polymerizing the facesheet.

Moreover, each fixing step comprises a step of applying a polymerizable adhesive.

In addition, the step of fixing a backplate to the cellular layer is followed by a step of polymerizing the facesheet and the polymerizable adhesive.

The invention also relates to an aircraft nacelle comprising an acoustic panel as described hereinabove.

The invention also relates to an aircraft comprising such a nacelle.

BRIEF DESCRIPTION OF THE DRAWINGS

The invention and its features and advantages will become more clearly apparent from reading the description which is given with reference to the attached drawings in which.

DETAILED DESCRIPTION

The remainder of the description will make reference to the abovementioned figures.

Figure 1:
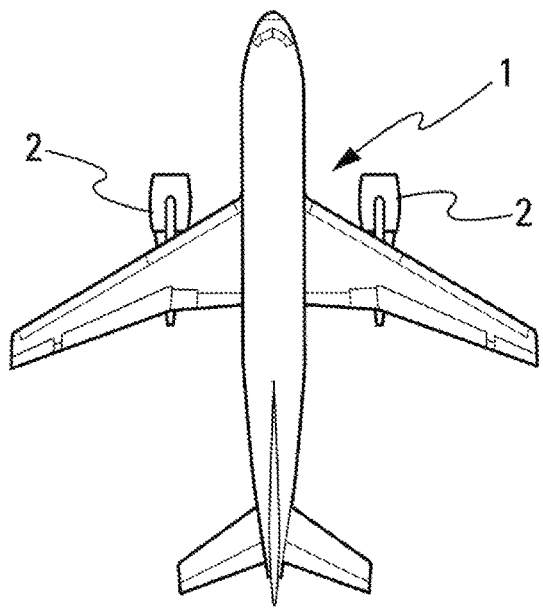
FIG. 1 depicts a view from above of an aircraft the nacelles of which comprise an acoustic panel.

The invention relates to an acoustic panel 3 for an aircraft 1 nacelle 2, notably the nacelle of a transport airplane (FIG. 1).

Figure 2:
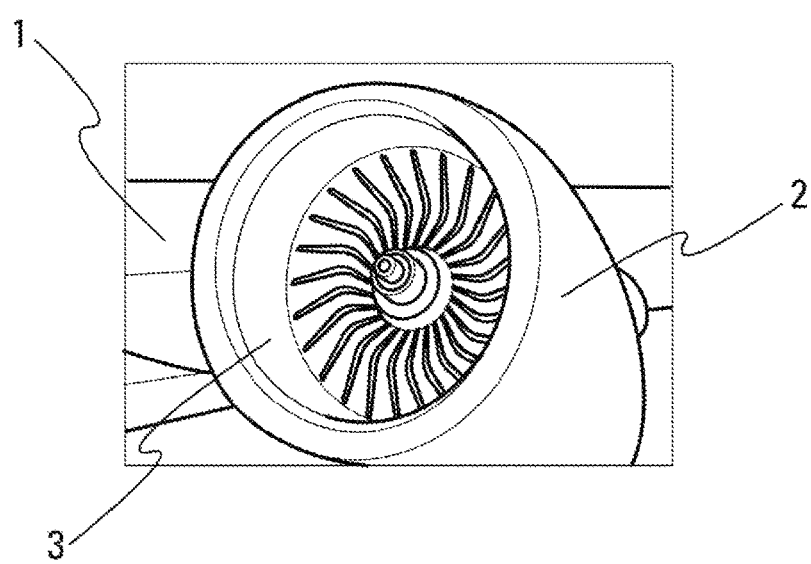
FIG. 2 depicts a perspective view of an aircraft nacelle comprising an acoustic panel.

This acoustic panel 3 may be placed on the internal wall of an aircraft 1 nacelle 2 (FIG. 2).

Figure 3:
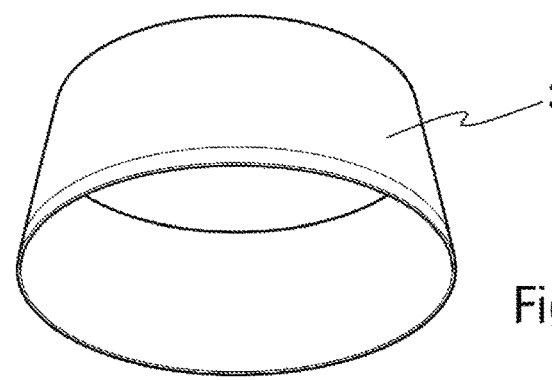
FIG. 3 depicts a perspective view of an acoustic panel according to one embodiment.
Figure 4:
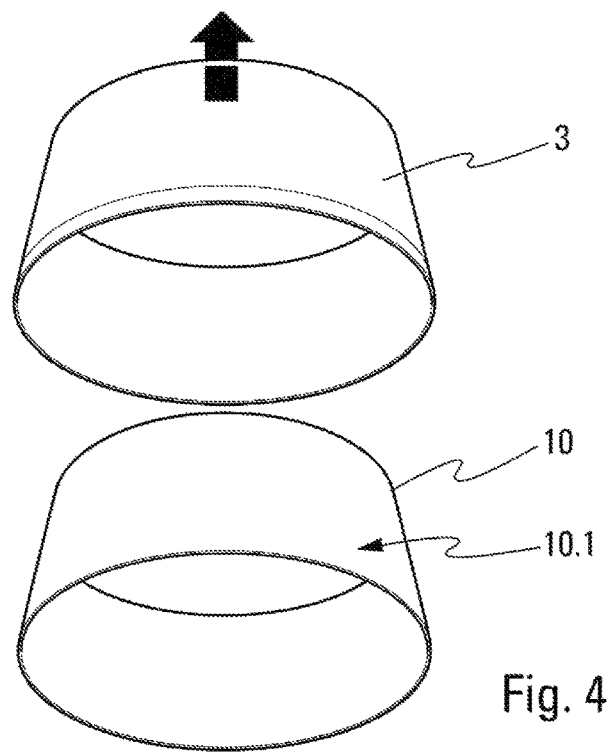
FIG. 4 depicts a perspective view of an acoustic panel removed from the mold used to form the acoustic panel.
Figure 5:
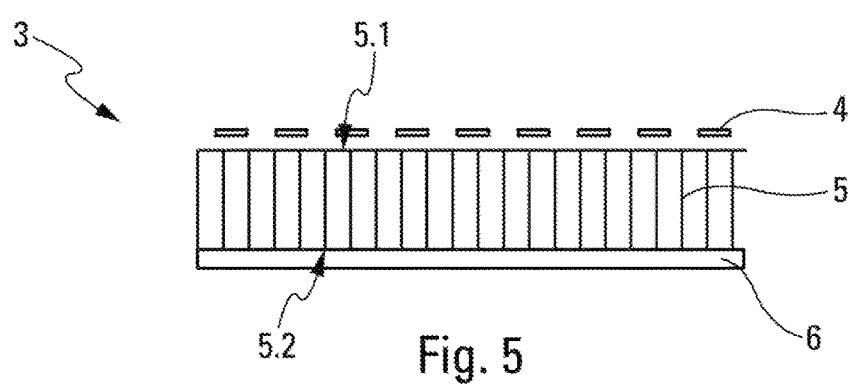
FIG. 5 depicts a cross section through an acoustic panel.
Figure 6:
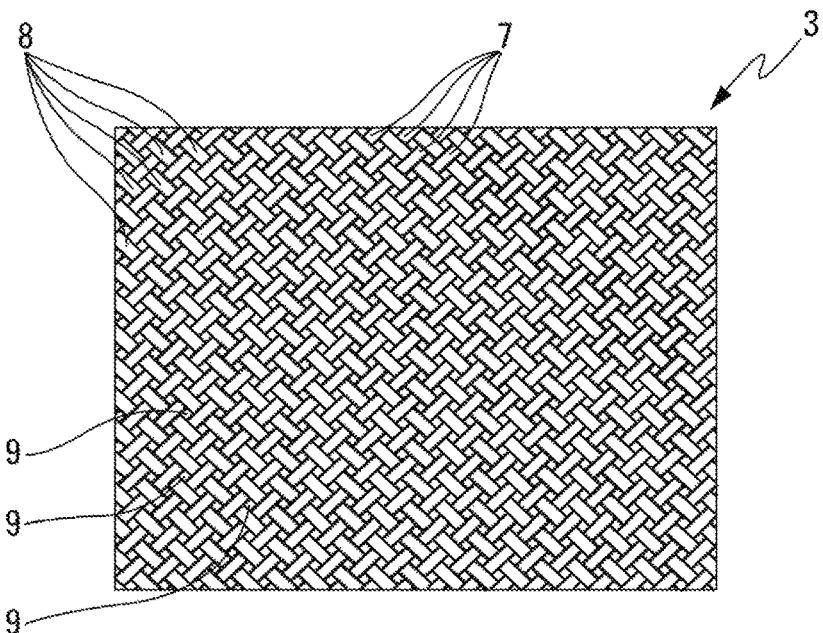
FIG. 6 depicts a view from above of a facesheet of an acoustic panel according to one embodiment.
Figure 7:
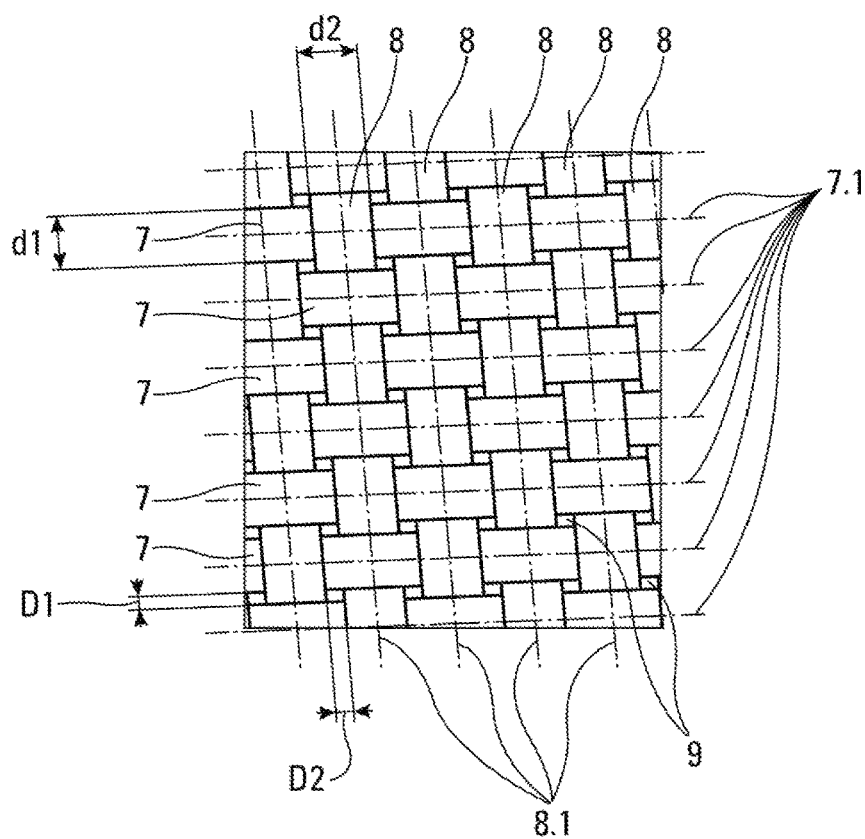
FIG. 7 depicts a close-up view of the facesheet according to one embodiment.

As depicted in FIG. 3, said panel 3 comprises a cellular layer 5 configured to trap noise.

The structure of the cellular layer 5 comprises one or more sublayers of cellular structure.

By way of example, the structure of the cellular layer 5 is of the honeycomb type.

The cellular layer 5 is delimited by a first surface 5.1 and an opposite second surface 5.2.

Said panel 3 further comprises a facesheet 4 fixed to the first surface 5.1 of the cellular layer 5 and a backplate 6 fixed to the second surface 5.2 of the cellular layer 5.

The backplate 6 is a layer that is impermeable to air. For example, the backplate 6 is a layer of carbon.

The facesheet 4 comprises a layer of a preimpregnated woven material containing weft yarns 7 spaced apart from one another and warp yarns 8 spaced apart from one another. The facesheet 4 exhibits openings 9 delimited by the spaces between pairs of weft yarns 7 and between pairs of warp yarns 8.

For preference, the yarns 7 and 8 are uniformly spaced apart.

For preference, the spacing D1 between the weft yarns 7 is the same as the spacing D2 between the warp yarns 8.

Nonlimitingly, the spacing D1 between the weft yarns 7 is between 0.3 mm and 1.5 mm.

Again nonlimitingly, the spacing D2 between the warp yarns 8 is between 0.3 mm and 1.5 mm.

The longitudinal axes 7.1 of the weft yarns 7 are substantially mutually parallel.

Likewise, the longitudinal axes 8.1 of the warp yarns 8 are substantially mutually parallel.

According to an alternative form, the longitudinal axes 7.1 of the weft yarns 7 are perpendicular to the longitudinal axes 8.1 of the warp yarns 8.

According to another alternative form, the longitudinal axes 7.1 of the weft yarns 7 make an angle strictly greater than 0° and less than 90° with the longitudinal axes 8.1 of the warp yarns 8.

For preference, the facesheet 4 is produced by weaving so as to control the spacing D1 and D2 of the weft yarns 7 and of the warp yarns 8 relative to one another. Thus, the facesheet has greater mechanical strength, under conditions of use, than the facesheet of the prior art. In particular, radial mechanical performance is improved.

The fact that the material is preimpregnated also makes it possible to maintain the spacing between the yarns 7 and 8, notably during the manufacture of the panel 3.

According to an alternative form of embodiment, the fibers of the facesheet 4 are obtained by 3D weaving.

The meaning of the term "yarn" may be extended to any elongate body that can be woven. The term "yarn" may notably signify a thread or a strip.

For preference, the yarns 7 and 8 are manufactured from fibers in the form of filaments. Thus, the yarns 7 and 8 may be defined in terms of the number of filaments per yarn (the "tow count"). This number, and the dimensions of the filaments make it possible to determine the distances d1 and d2 between the spacings D1 and D2.

By way of example, the fibers from which the yarns 7 and 8 are manufactured are carbon fibers.

The panel 3 thus has remarkable properties, such as a lightening of weight with respect to the known acoustic panels and an improved aerodynamic profile.

The invention also relates to a method of manufacturing an acoustic panel 3 for an aircraft 1 nacelle 2.

Figure 8:
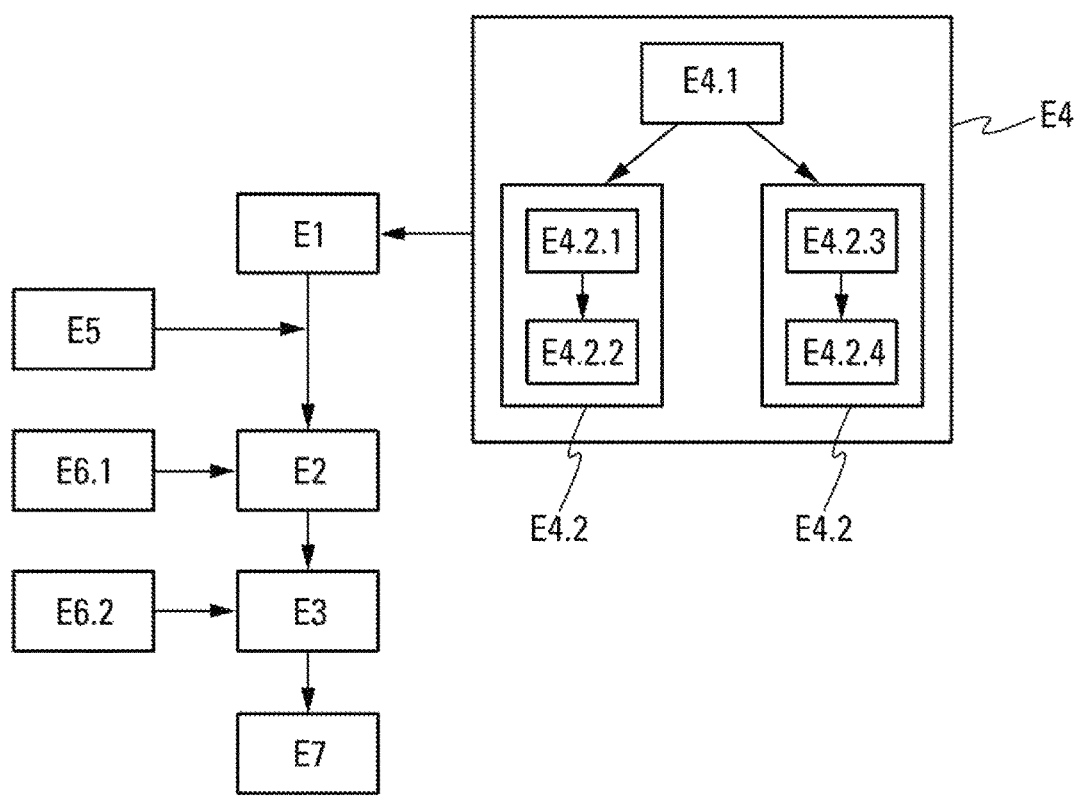
FIG. 8 illustrates a flow chart for methods according to an aspect of the invention.

Referring to FIG. 8, the method comprises a step E1 of applying the facesheet 4 to a surface 10.1 of a mold 10. The shape of the surface 10.1 of the mold 10 is adapted to suit the shape of the nacelle 2 that is intended to be fitted with the acoustic panel 3.

This step E1 of applying a facesheet 4 consists in applying a layer of preimpregnated woven material, like the one described hereinabove. The application of the facesheet 4 may involve applying preimpregnated woven material in a form of bundles (or pieces) of preimpregnated woven material or of strips of preimpregnated woven material. For example, these strips are wound strips which are unwound as the facesheet 4 is applied. Discrete regions of overlap between bundles or strips may exist, in order to ensure the integrity of the structure.

The method further comprises a step E2 of fixing the first surface 5.1 of the cellular layer 5 to the facesheet 4.

The method also comprises a step E3 of fixing the backplate 6 to the second surface 5.2 of the cellular layer 5. This second surface 5.2 is the opposite surface to the first surface 5.1 of the cellular layer 5.

The method moreover involves a preliminary step E4 of making the facesheet 4. This step E4 consists in making the layer of preimpregnated woven material containing weft yarns 7 spaced apart from one another and warp yarns 8 spaced apart from one another, so as to form openings 9 between the yarns 7 and 8.

In one embodiment, the step E4 of making the facesheet 4 comprises a step E4.1 of weaving a layer in such a way that the weft yarns 7 of the weave are spaced apart from one another and that the warp yarns 8 of the weave are spaced apart from one another, so as to form a layer of woven material.

Moreover, the making step E4 comprises a step E4.2 of preimpregnating the woven material so as to form a layer of preimpregnated woven material.

The preimpregnation step E4.2 may be performed using various methods.

According to one embodiment, the preimpregnation step E4.2 may be carried out using a method of impregnating it with a solvent (a "solvent dip process" or "solvent impregnation process").

According to this method, the preimpregnation step E4.2 comprises:

a step E4.2.1 of dipping the woven material into a bath containing a resin dissolved in a solvent, and a step E4.2.2 of drying so that the solvent evaporates from the preimpregnated woven material.

According to another embodiment, the preimpregnation step E4.2 may employ a hot-melt method.

According to that method, the preimpregnation step E4.2 comprises:

a step E4.2.3 of applying a resin to a substrate using a hot-melt process, and a step E4.2.4 of pressing and heating the substrate with the woven material so that the resin impregnates the woven material.

The substrate to which resin is applied may be paper.

This preimpregnation step E4.2 in particular makes it possible to keep the weft yarns 7 and the warp yarns 8 spaced apart from one another during the manufacture of the acoustic panel 3.

According to an alternative form of embodiment, the step E1 of applying the facesheet 4 to the surface 10.1 of a mold 10 is followed by a step E5 of polymerizing the facesheet 4.

According to an alternative form of embodiment, each fixing step E2 and E3 comprises a step E6.1 E6.2 of applying a polymerizable adhesive.

For preference, in this last alternative form of embodiment, the step E3 of fixing a backplate 6 to the cellular layer 5 is followed by a step E7 of polymerizing the polymerizable adhesive. If the step E5 of polymerizing the facesheet 4 has not been performed after the step E1 of applying the facesheet 4 to the surface 10.1 of a mold 10, the step E7 of polymerizing the polymerizable adhesive also involves polymerizing the facesheet. That may therefore allow two polymerization steps (polymerization of the facesheet and then of the adhesive) to be combined into a single step.

This method makes it possible to eliminate the following steps:

the manufacture of a facesheet 4 using lengthy, complex and expensive methods, the manual inspection to assess the quality of the facesheet 4, an intermediate step of polymerizing the facesheet 4.

Thus, this method makes it possible to reduce the time taken to manufacture the acoustic panel 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of manufacturing an acoustic panel for an aircraft nacelle, comprising,
    applying a facesheet to the surface of a mold;
    fixing a first surface of a cellular layer configured to trap noise to the facesheet;
    fixing a backplate to a second surface of the cellular layer which is the opposite surface to the first surface;
    wherein the step of applying a facesheet to the surface of a mold includes applying a layer of preimpregnated woven material containing weft yarns spaced apart from one another and warp yarns spaced apart from one another, so as to form openings between the yarns, the weft yarns having a mutual spacing of between 0.3 mm and 1.5 mm, and the warp yarns having a mutual spacing of between 0.3 mm and 1.5 mm,
    making the facesheet, including:
        weaving a layer so that the weft yarns of the weave are spaced apart from one another, and so that the warp yarns of the weave are spaced apart from one another, so as to form a layer of woven material; and
        preimpregnating the woven material so as to form a layer of preimpregnated woven material;
    wherein each fixing step comprises applying a polymerizable adhesive, and
    wherein the step of fixing a backplate to the cellular layer is followed by polymerizing the facesheet and the polymerizable adhesive.

2. The method as claimed in claim 1, wherein the preimpregnation step comprises:
    dipping the woven material in a bath containing a resin dissolved in a solvent; and
    drying so that the solvent evaporates from the preimpregnated woven material.

3. The method as claimed in claim 1, wherein the preimpregnation step comprises:
    applying a resin to a substrate using a hot-melt method; and
    pressing and heating the substrate with the woven material so that the resin impregnates the woven material.

4. The method as claimed in claim 1, wherein the step of applying the facesheet to the surface of a mold is followed by polymerizing the facesheet.

\* \* \* \* \*